(12) United States Patent
Tran

(10) Patent No.: US 11,023,422 B2
(45) Date of Patent: Jun. 1, 2021

(54) GENERATING SNAPSHOT OF AN INTEGRATION ENVIRONMENT TO FACILITATE REPLICATION OF THE ENVIRONMENT

(71) Applicant: Dell Products L.P., Round Rock, TX (US)

(72) Inventor: Trung M. Tran, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 612 days.

(21) Appl. No.: 14/596,522

(22) Filed: Jan. 14, 2015

(65) Prior Publication Data
US 2016/0203159 A1 Jul. 14, 2016

(51) Int. Cl.
| | | |
|---|---|---|
| *G06F 16/178* | (2019.01) | |
| *G06F 9/455* | (2018.01) | |
| *G06F 16/11* | (2019.01) | |
| *G06F 8/71* | (2018.01) | |

(52) U.S. Cl.
CPC ........ *G06F 16/178* (2019.01); *G06F 9/45558* (2013.01); *G06F 16/128* (2019.01); *G06F 8/71* (2013.01); *G06F 2009/4557* (2013.01)

(58) Field of Classification Search
CPC ........... G06F 17/30174; G06F 9/45558; G06F 17/30088; G06F 17/30; G06F 2009/4557; G06F 8/71

USPC ......................................................... 707/620
See application file for complete search history.

(56) References Cited

U.S. PATENT DOCUMENTS

| | | | | |
|---|---|---|---|---|
| 8,789,208 | B1 * | 7/2014 | Sundaram | G06F 3/065 726/29 |
| 9,021,448 | B1 * | 4/2015 | Gagliardi | G06F 11/3636 717/130 |
| 2008/0184225 | A1 * | 7/2008 | Fitzgerald | G06F 9/455 718/1 |
| 2009/0094603 | A1 * | 4/2009 | Hiltgen | G06F 9/45558 718/1 |
| 2015/0156212 | A1 * | 6/2015 | Khatri | H04L 63/1416 726/23 |

* cited by examiner

*Primary Examiner* — Hosain T Alam
*Assistant Examiner* — Tracy M McGhee
(74) *Attorney, Agent, or Firm* — Terrile, Cannatti & Chambers; Stephen A. Terrile

(57) ABSTRACT

A system, method, and computer-readable medium are disclosed for reproducing an issue via a remote access controller by providing the remote access controller with a method for allowing a user to take a snapshot (i.e., a representation of the state of all components of an integration environment at a particular point in time) of an integration of the various components administered via a management application suite executing on a remote access controller. In certain embodiments, the management application suite comprises an OpenManage Integration for VMware vCenter. Such a method reduces the time needed to determine a root cause of an issue and assists system managers in properly providing a solution to the issue.

18 Claims, 3 Drawing Sheets

GENERATING SNAPSHOT OF AN INTEGRATION ENVIRONMENT TO FACILITATE REPLICATION OF THE ENVIRONMENT

BACKGROUND OF THE INVENTION

Field of the Invention

The present invention relates to information handling systems. More specifically, embodiments of the invention relate to generating a snapshot of an integration environment to facilitate replication of the environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse (KVM). Over time, remote management capabilities evolved to allow administrators to monitor, manage, update and deploy servers over a network connection.

One example of these capabilities is the use of a remote access controller (RAC), which is operably coupled to, or embedded within, the server and remotely accessed by an administrator via an out-of-band communication link. As an example, the Integrated Dell Remote Access Controller (iDRAC) from Dell, Inc. has its own processor, memory, network connection, and access to the system bus. Integrated into the motherboard of a server, it provides out-of-band management facilities that allow administrators to deploy, monitor, manage, configure, update, troubleshoot and remediate the server from any location, and without the use of agents. It is known to provide remote access controllers with a management application suite which enhance certain system management functionality of the remote access controller. For example, OpenManage Integration for VMware vCenter (Spectre) is a highly complex management application suite for System Management, which are integrated with a remote access controller such as the iDRAC, lifecycle controller (LC), OpenManage Server Administrator (OMSA), VMware vSphere Client, and Web Client.

The use of a RAC for remote management of a server in a data center can be advantageous. However, it can also present challenges. For example, attempting to reproduce an issue which is identified by the RAC can be time consuming and sometimes not even possible because a particular customer server setup and environment are not often revealed completely to the remote management for reasons such as to security purposes.

SUMMARY OF THE INVENTION

A system, method, and computer-readable medium are disclosed for reproducing an issue via a remote access controller by providing the remote access controller with a method for allowing a user to take a snapshot (i.e., a representation of the state of all components of an integration environment at a particular point in time) of an integration of the various components administered via a management application suite executing on a remote access controller. In certain embodiments, the management application suite comprises an OpenManage Integration for VMware vCenter. Such a method reduces the time needed to determine a root cause of an issue and assists system managers in properly providing a solution to the issue.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
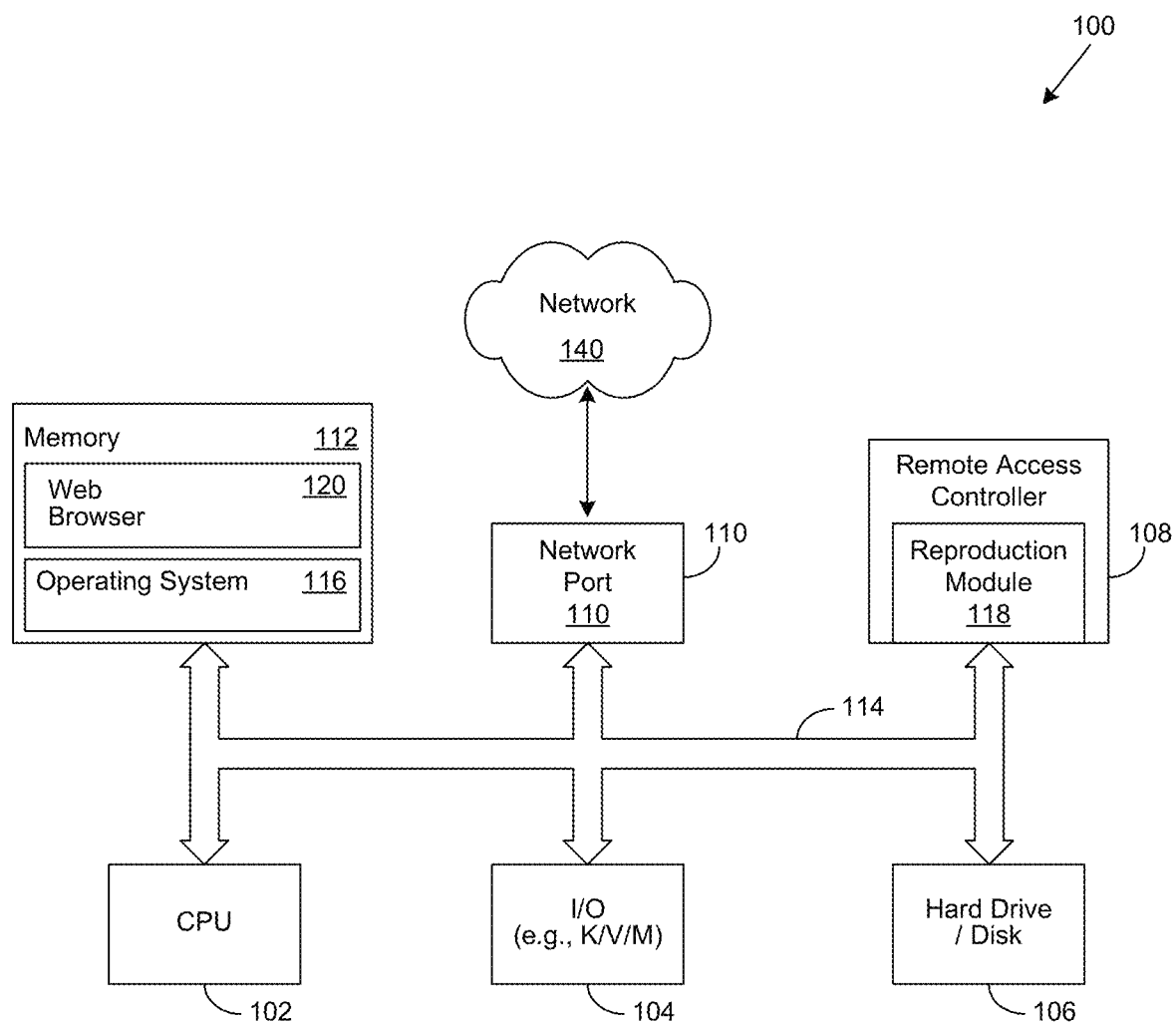
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems, such as a remote access controller (RAC) 108. In various embodiments, the RAC 108 includes a management application suite reproduction module 118. In one embodiment, the management application suite reproduction module 118 is operatively coupled to the RAC 108. In one embodiment, the management application suite reproduction module 118 is embedded in the RAC 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web browser 120.

Figure 2:
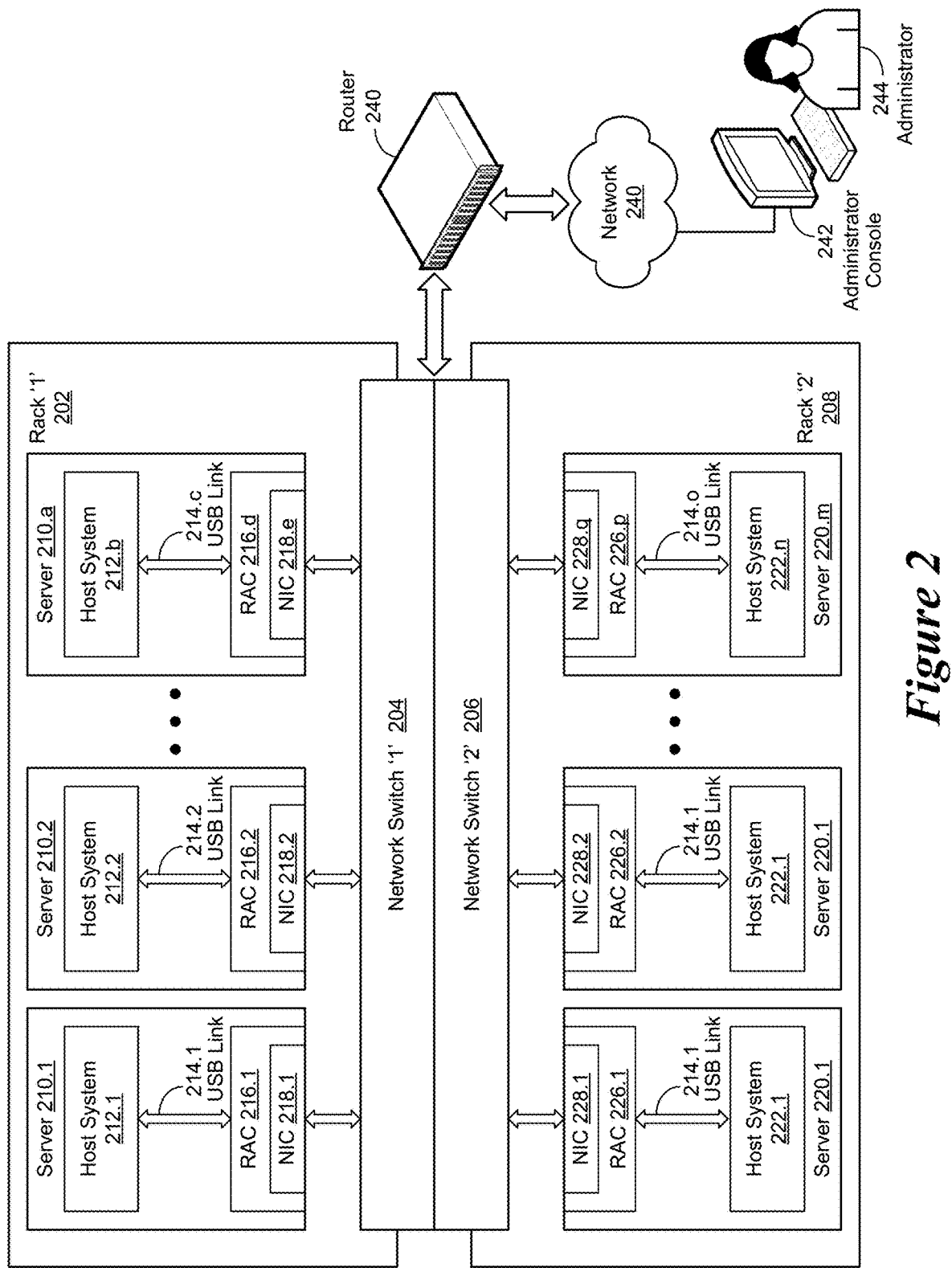
FIG. 2 is a simplified block diagram of a plurality of remote access controllers (RACs) implemented with a corresponding plurality of servers.

FIG. 2 is a simplified block diagram of a plurality of remote access controllers (RACs) implemented with a corresponding plurality of servers in accordance with an embodiment of the invention. FIG. 2 illustrates one example of an integration environment in which the present invention operates.

As shown in FIG. 2, server rack '1' 202 includes a network switch '1' 204 and servers 210.1 and 210.2 through 210.a, where 'a' is an integer index greater than or equal to 2. In one embodiment, the servers 210.1 and 210.2 through 210.a respectively include a host system 212.1 and 212.2 through 212.b and a RACs 216.12 and 216.2 through 216.d, where 'b' and 'd' are integer indexes greater than or equal to 2. In one embodiment, the host systems 212.1 and 212.2 through 212.b are respectively coupled to the RACs 216.1 and 216.2 through 216.d via Universal Serial Bus (USB) links 214.1 and 214.2 through 214.c, where 'c' is an integer index greater than or equal to 2. In one embodiment, the RACs 216.1 and 216.2 through 216.d are respectively embedded in the servers 210.1 and 210.2 through 210.a. In one embodiment, the RACs 216.1 and 216.2 through 216.d respectively include a Network Interface Controller (NIC) 218.1 and 218.2 through 218.e, where 'e' is an integer index greater than or equal to 2. In one embodiment, the NICs 218.1 and 218.2 through 218.e are used to respectively couple the RACs 216.1 and 216.2 through 216.d to the network switch 'a' 204.

Server rack '2' 208 likewise includes a network switch '2' 206 and servers 220.1 and 220.2 through 220.m, where 'm' is an integer index greater than or equal to 2. In one embodiment, the servers 220.1 and 220.2 through 220.m respectively include a host system 222.1 and 222.2 through 222.n and RACs 226.1 and 226.2 through 226.p, where 'n' and 'p' are integer indexes greater than or equal to 2. In one embodiment, the host systems 222.1 and 222.2 through 222.b are respectively coupled to the RACs 226.1 and 226.2 through 226.p via USB links 224.1 and 224.2 through 224.o, where 'o' is an integer index greater than or equal to 2. In one embodiment, the RACs 226.1 and 226.2 through 226.p are respectively embedded in the servers 220.1 and 220.2 through 220.m. In one embodiment, the RACs 226.1 and 226.2 through 226.p respectively include a NIC 228.1 and 228.2 through 228.q, where 'q' is an integer index greater than or equal to 2. In one embodiment, the NICs 228.1 and 228.2 through 228.q are used to respectively couple the RACs 226.1 and 226.2 through 226.p to the network switch 'b' 206.

In one embodiment, network switch '1' 201 and network switch '2' 206 are communicatively coupled to respectively exchange data between servers 210.1 and 210.2 through 210.a and servers 220.1 and 220.2 through 220.m. In one embodiment, the network switches '1' 204 and '2' 206 are communicatively coupled via router to a link-local network 240. In one embodiment, the link-local network 240 is also communicatively coupled to an administrator console 242, which is used by an administrator 244 to administer RACs 216.1 and 216.2 through 216.d and RACs 226.1 and 226.2 through 226.p. In one embodiment, each of the RACs 216.1 and 216.2 through 216.d and RACs 226.1 and 226.2 through 226.p are assigned a unique link-local Internet Protocol (IP) address by the administrator 244.

As used herein, a link-local network refers to a private network that uses a private IP address space. These addresses are commonly used enterprise local area networks (LANs) when globally routable addresses are either not mandatory, or are not available for the intended network applications. These addresses are characterized as private because they are not globally delegated and IP packets addressed by them cannot be transmitted onto the public Internet. As the name implies, a link-local network uses link-local addresses, which refers to an IP address that is intended only for communications within a segment, or link, of a local network, or to establish a point-to-point network connection to a host.

Routers, such as router 240, do not forward packets with link-local IP addresses. Link-local IP addresses may be assigned manually by an administrator or by operating system procedures. They may also be assigned using stateless address autoconfiguration. In IPv4, their normal use is typically restricted to the assignment of IP addresses to network interfaces when no external, stateful mechanism of address configuration exists, such as the Dynamic Host Configuration Protocol (DHCP), or when another primary configuration method has failed. In IPv6, link-local addresses are generally utilized for the internal functioning of various protocol components.

Figure 3:
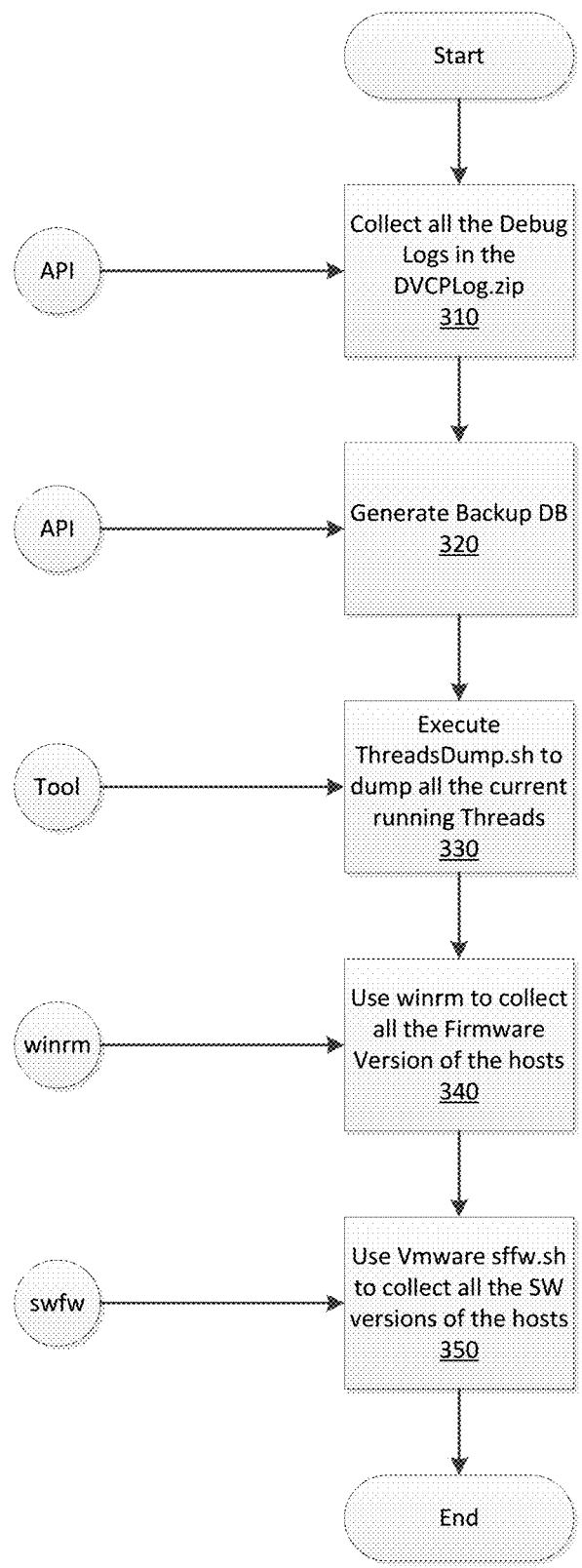
FIG. 3 shows a flow chart of the operation of a management application suite reproduction system.

Referring to FIG. 3, a flow chart of the operation of a management application suite reproduction system 300 is shown. In certain embodiments, the management application suite reproduction system 300 corresponds to the management application suite reproduction module 118.

The management application suite reproduction system 300 begins operation by collecting all debug logs which are generated by the remote access controller 108 at step 310. In certain embodiments, the debug logs are added to a specific trouble shooting file such as a trouble shooting zip file e.g., DVCPLog.zip) via a remote access controller application program interface (API) and a windows remote management (winRM) Web Services (WS) management protocol. Additional in certain embodiments the debug log includes a system event log (SEL) type log and a lifecycle controller (LC) type log.

In certain embodiments, the SEL type log is generated as follows:

--- winrm e cimv2/root/dcim/DCIM_SELRecordLog -u:<usr> -p:<pwd> -r:https://<iDRACIP>/wsman:443 -auth:basic -encoding:utf-8 -SkipCACheck -SkipCNCheck

---

Where, winrm is a command which can be executed from any Windows based OS to enable the SEL type Log from a server, usr is the username to access the server, pwd is the password to access the server, and iDRACIP is the iDRAC IP of the server.

In certain embodiments, the LC log is generated as follows:

```
winrm i ExportLCLog http://schemas.dmtf.org/wbem/wscim/1/cim-
schema/2/root/dcim/DCIM_LCService?SystemCreationClassName=DCIM_Com
puterSystem+CreationClassName=DCIM_LCService+SystemName=DCIM:Comp
uterSystem+Name=DCIM:LCService -u:root -p:calvin -
r:https://<iDRACIP>/wsman -SkipCNCheck -SkipCAcheck -encoding:utf-8 -
a:basic @{IPAddress="<LaptopIP>";
ShareName="Projects\Spectre\Trung";ShareType="2";
Username="americas\trung_m_tran";Password="Password";
FileName="export_lcl1.xml"}
```

Where, winrm is a command which can be executed from any Windows based OS to enable the LC type Log from a server, usr is the username to access the server, pwd is the password to access the server, and iDRACIP is the iDRAC IP of the server, and LaptopIP is the physical IP of the Laptop.

Next, at step 320, the management application suite reproduction system 300 generates a backup database via the remote access controller API. Next at step 330, the management application suite reproduction system 300 executes a thread dump operation to dump all of the threads that are currently running in the environment. In certain embodiments, the thread dump operation is performed via a thread dump script (e.g., ThreadsDump.sh). More specifically, in certain embodiments, the thread dump script is set forth as:

```
#!/bin/bash
if [ $# -eq 0 ]; then
    echo >&2 "Usage: jstackSeries <pid> <run_user> [ <count> [
    <delay> ] ]"
    echo >&2 "       Defaults: count = 10, delay = 0.5 (seconds)"
    exit 1
fi
pid=$1           # required
user=$2          # required
count=${3:-10}   # defaults to 10 times
delay=${4:-0.5}  # defaults to 0.5 seconds
while [ $count -gt 0 ]
do
    sudo -u $user jstack -l $pid >jstack.$pid.$(date +%H%M%S.%N)
    sleep $delay
    let count--
    echo -n "."
done
```

Next at step 340, the firmware version of all host is collected. In certain embodiments, the firmware version is collected via a management protocol such as the winRM WS-management protocol. Next at step 350, all of the software versions of the hosts are collected. In certain embodiments, the software versions of the hosts are collected via a collection script. In certain embodiments, this collection script corresponds to a virtualization software script such as VMware sffw.sh. In certain embodiments, the information regarding the Software and files are stored within the trouble shooting file. Specifically, in certain embodiments, the Software version files are stored as: <hostname>.osversion and <hostname>.fwversion.

In certain embodiments, the Software and Firmware version files are generated as follows:

```
winrm e cimv2/root/dcim/DCIM_SoftwareIdentity -u:<username>
-p:<pwd> -
```

-continued

```
r:https://<iDRACIP>:443/wsman -auth:basic -encoding:utf-8
-skipCNcheck -
skipCAcheck
# /usr/lib/vmware/vm-support/bin/swfw.sh
```

Where, winrm is a command which can be executed from any Windows based OS, usr is the username to access the server, pwd is the password to access the server, and iDRACIP is the iDRAC IP of the server.

After step 350 completes operation, the specific trouble shooting file includes a snapshot of the server environment being managed by the remote access controller. This snapshot reduces the time needed to determine a root cause of an issue that prompted the generation of the snapshot and assists system managers in properly providing a solution to the issue. During this operation, all the software, hardware and firmware versions will be collected. To do so, a GetHost operation is used to collect all the manage hosts and each host will be processed to collect its software, hardware and firmware versions currently installed and being used.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for providing a snapshot of an integration environment, the integration environment comprising a server rack, a plurality of servers, a network switch and a remote access controller, comprising:

provided the integration environment with a management application suite reproduction system, the management application suite reproduction system being associated with the remote access controller;

collecting debug logs generated by the remote access controller;

generating a backup database via an application program interface of the remote access controller;

executing a thread dump operation to dump all threads that are currently executing within the integration environment, the thread dump operation being performed via a thread dump script;

collecting a firmware version of all hosts within the integration environment; and, obtaining a snapshot of all components within the integration environment via the management application suite reproduction system, the snapshot comprising a representation of a state of all components of the integration environment at a particular point in time; and wherein the management application suite reproduction system collects the firmware version of all hosts within the integration environment via a windows remote management (winRM) Web Services management protocol.

2. The method of claim 1, wherein:
the management application suite comprises an OpenManage Integration for VMware vCenter.

3. The method of claim 1, wherein:
the management application suite reproduction system stores the snapshot to a troubleshooting file.

4. The method of claim 3, wherein:
the troubleshooting file comprises a system event log (SEL) type log and a lifecycle controller (LC) type log;
the SEL type log is generated using a windows remote management command; and,
the LC type log is generated using a windows remote management command.

5. The method of claim 1, wherein:
the thread dump operation to dump all of the threads that are currently running in the integration environment is performed via a thread dump script.

6. The method of claim 1, wherein:
the management application suite reproduction system collects all of the software versions of software executing on each of the hosts within the integration environment.

7. A system comprising:
a processor;
a data bus coupled to the processor; and
a non-transitory, computer-readable storage medium embodying computer program code for providing a snapshot of an integration environment, the integration environment comprising a server rack, a plurality of servers, a network switch and a remote access controller, the non-transitory, computer-readable storage medium being coupled to the data bus, the computer program code interacting with a plurality of computer operations and comprising instructions executable by the processor and configured for:

providing the integration environment with a management application suite reproduction system, the management application suite reproduction system being associated with the remote access controller;

collecting debug logs generated by the remote access controller;

generating a backup database via an application program interface of the remote access controller;

executing a thread dump operation to dump all threads that are currently executing within the integration environment, the thread dump operation being performed via a thread dump script;
collecting a firmware version of all hosts within the integration environment; and,
obtaining a snapshot of all components within the integration environment via the management application suite reproduction system, the snapshot comprising a representation of a state of all components of the integration environment at a particular point in time; and wherein
the management application suite reproduction system collects the firmware version of all hosts within the integration environment via a windows remote management (winRM) Web Services management protocol.

8. The system of claim 7, wherein:
the management application suite comprises an OpenManage Integration for VMware vCenter.

9. The system of claim 7, wherein:
the management application suite reproduction system stores the snapshot to a troubleshooting file.

10. The system of claim 8, wherein:
the troubleshooting file comprises a system event log (SEL) type log and a lifecycle controller (LC) type log;
the SEL type log is generated using a windows remote management command; and,
the LC type log is generated using a windows remote management command.

11. The system of claim 7, wherein:
the thread dump operation to dump all of the threads that are currently running in the integration environment is performed via a thread dump script.

12. The system of claim 7, wherein:
the management application suite reproduction system collects all of the software versions of software executing on each of the hosts within the integration environment.

13. A non-transitory, computer-readable storage medium embodying computer program code for providing a snapshot of an integration environment, the integration environment comprising a server rack, a plurality of servers, a network switch and a remote access controller, the computer program code comprising computer executable instructions configured for:
providing the integration environment with a management application suite reproduction system, the management application suite reproduction system being associated with the remote access controller;
collecting debug logs generated by the remote access controller;
generating a backup database via an application program interface of the remote access controller;
executing a thread dump operation to dump all threads that are currently executing within the integration environment, the thread dump operation being performed via a thread dump script;
collecting a firmware version of all hosts within the integration environment; and,
obtaining a snapshot of all components within the integration environment via the management application suite reproduction system, the snapshot comprising a representation of a state of all components of the integration environment at a particular point in time; and wherein
the management application suite reproduction system collects the firmware version of all hosts within the integration environment via a windows remote management (winRM) Web Services management protocol.

14. The non-transitory, computer-readable storage medium of claim 13, wherein
the management application suite comprises an OpenManage Integration for VMware vCenter.

15. The non-transitory, computer-readable storage medium of claim 13, wherein:
the management application suite reproduction system stores the snapshot to a troubleshooting file.

16. The non-transitory, computer-readable storage medium of claim 15, wherein:
the troubleshooting file comprises a system event log (SEL) type log and a lifecycle controller (LC) type log;
the SEL type log is generated using a windows remote management command; and,
the LC type log is generated using a windows remote management command.

17. The non-transitory, computer-readable storage medium of claim 13, wherein:
the thread dump operation to dump all of the threads that are currently running in the integration environment is performed via a thread dump script.

18. The non-transitory, computer-readable storage medium of claim 13, wherein:
the management application suite reproduction system collects all of the software versions of software executing on each of the hosts within the integration environment.

* * * * *